United States Patent
Hutton

(10) Patent No.: US 7,458,614 B2
(45) Date of Patent: Dec. 2, 2008

(54) THREAD SUPPORTING STABILIZER ASSEMBLY

(75) Inventor: Peter B. Hutton, Houston, TX (US)

(73) Assignee: Phoenix Precision Ltd (CA)

( * ) Notice: Subject to any disclaimer, the term of this patent is extended or adjusted under 35 U.S.C. 154(b) by 333 days.

(21) Appl. No.: 11/274,893

(22) Filed: Nov. 16, 2005

(65) Prior Publication Data

US 2006/0175827 A1     Aug. 10, 2006

Related U.S. Application Data

(60) Provisional application No. 60/628,127, filed on Nov. 17, 2004.

(51) Int. Cl.
*F16L 15/00* (2006.01)

(52) U.S. Cl. .................... 285/219; 285/208; 285/143.1; 29/469; 29/282

(58) Field of Classification Search ................. 285/212, 285/219, 384, 208, 353, 143.1; 29/469, 525.02, 29/282

See application file for complete search history.

(56) References Cited

U.S. PATENT DOCUMENTS

| 3,498,644 | A | * | 3/1970 | Davies et al. ............... 285/212 |
| 4,920,626 | A | * | 5/1990 | Nimberger ................... 29/282 |
| 4,974,308 | A | | 12/1990 | Nimberger |
| 5,292,155 | A | * | 3/1994 | Bell et al. ..................... 285/18 |
| 6,609,730 | B1 | * | 8/2003 | Hutton ........................ 285/114 |
| 6,871,881 | B1 | * | 3/2005 | Hutton ........................ 285/219 |
| 7,070,208 | B2 | * | 7/2006 | Richey et al. ............... 285/220 |
| D541,645 | S | * | 5/2007 | Hutton ......................... D3/387 |

* cited by examiner

*Primary Examiner*—David E Bochna
(74) *Attorney, Agent, or Firm*—Novak Druce LLP

(57) ABSTRACT

A pressure tap assembly for connection between a pipeline flange and a manifold and/or transmitter in which can transmit the load from a threaded end of the tap to the body of the tap. In one embodiment the tap is provided with a tap body having an integral stabilizing flange. By the use of a force providing device the stabilizing flange is forced in a direction away from the pipeline flange thereby reducing the load on the threads on the threaded end of the tap. A combination of a stabilizing nut and stabilizer base can be used to provide the force.

16 Claims, 3 Drawing Sheets

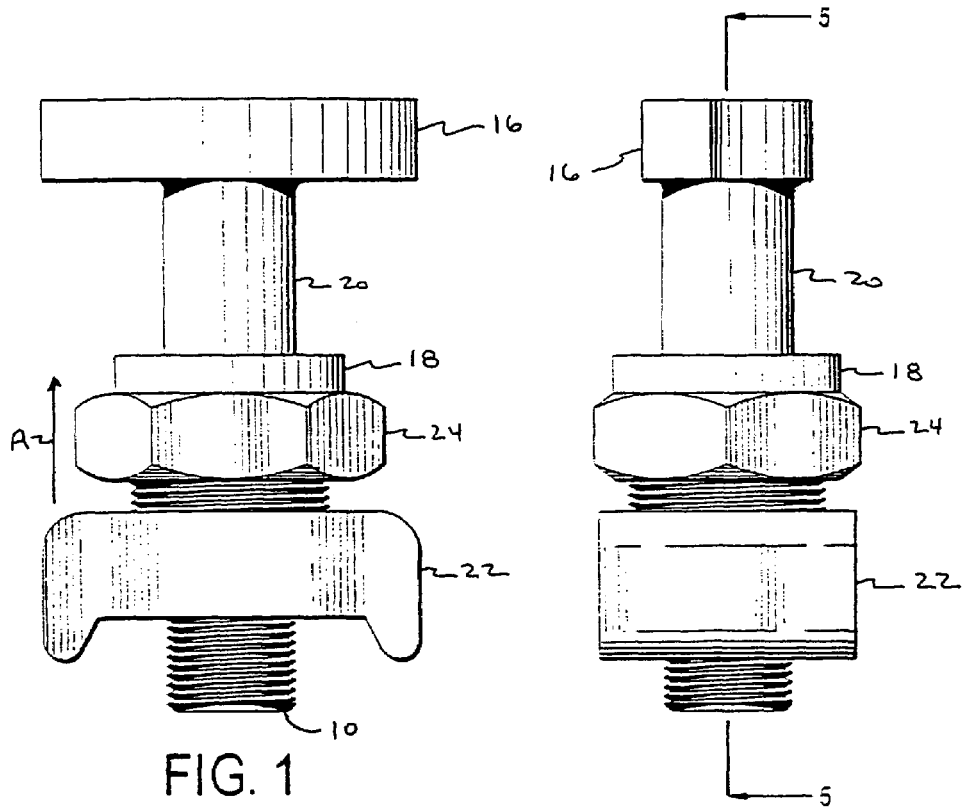
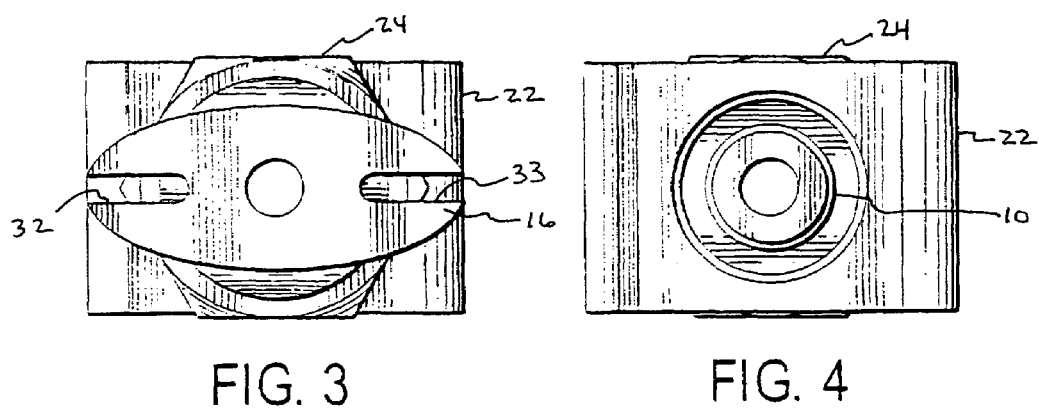

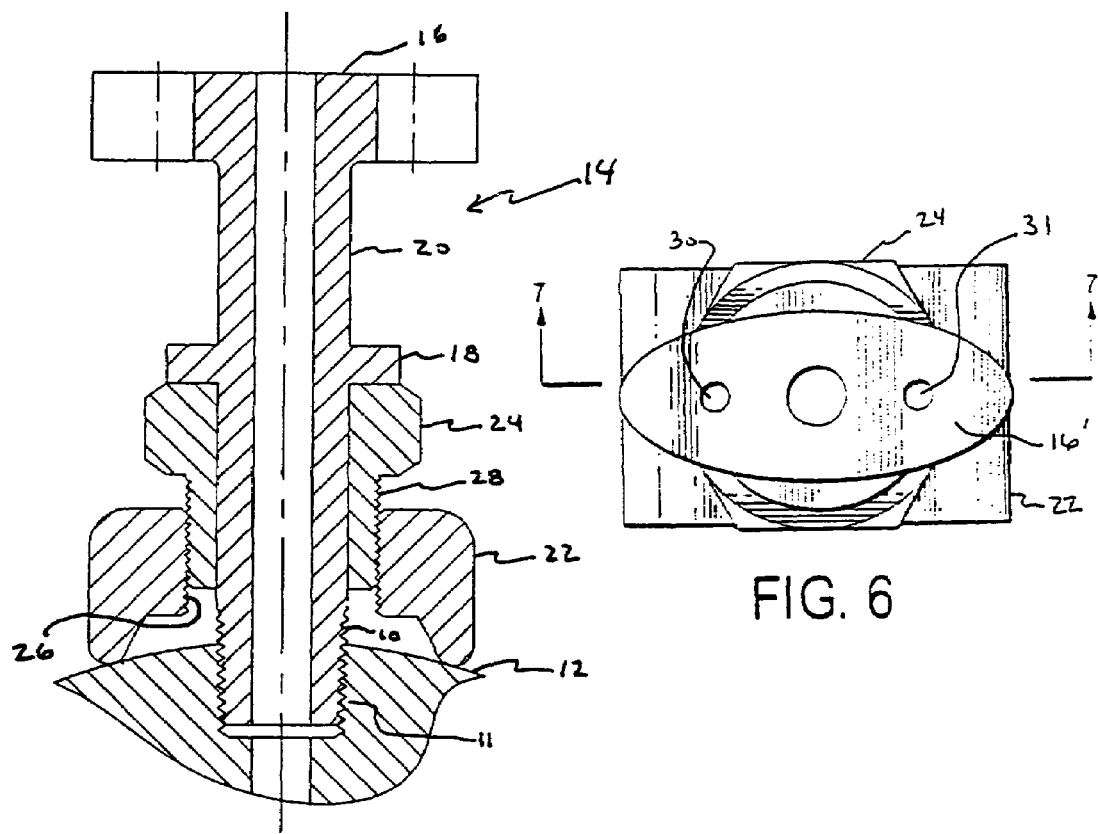
FIG. 5
FIG. 6
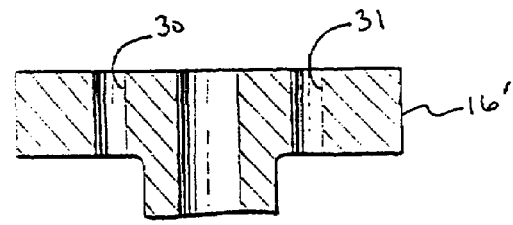
FIG. 7

THREAD SUPPORTING STABILIZER ASSEMBLY

CROSS REFERENCE TO RELATED APPLICATIONS

This application is a non-provisional application claiming the benefit of U.S. Provisional application Ser. No. 60/628,127 filed Nov. 17, 2004, and U.S. Design patent application Ser. No. 29/221,625. Pat. No. D541,645, filed Jan. 21, 2005, the entire disclosures of which are herein incorporated by reference

BACKGROUND OF THE INVENTION

1. Field of Invention

The invention relates to pressure tap assemblies, and more specifically to a tap assembly which is stabilized such that tendency for leaking and/or failure by shearing is reduced.

2. Description of the Related Art

Pressure taps, such as used in a vessel, including a pipeline on one or both sides of an orifice plate, are useful to measure pressure in a conduit, such as a pipeline carrying liquid gaseous fluid, which pressure measurement can be used for various calculations, such as flow rate; metering, etc. The taps can be fluidly connected to a pressure sensor, which in some cases acts as a pressure transmitter. When used on either side of an orifice plate the high and low pressure measurements can be used as inputs to so-called "smart" differential pressure transmitters.

The taps themselves are standardized with NPT threads. By means of pipe fittings or manifolds the taps can be placed in fluid communication with pressure, or differential pressure, transmitters for purposes of providing information on the pressure of the fluid inside the conduit.

One of the shortcomings of the conventional taps has been the propensity of the load on the taps being transmitted to the NPT threads causing leaking of the fluid in the pipeline to escape to the environment. In cases where the pipeline is carrying combustible or explosive fluids, e.g. oil or natural gas, the escape of the fluid from the threads could also result in personal injury and damage to property. In extreme loadings, the NPT threads of the taps are stressed to their elastic limit resulting in shearing of the taps and release of the fluid in great quantities to the environment.

Thus, it is an object of the present invention to provide stabilized taps of a construction where the propensity of leaking of fluid through the NPT threads is reduced. It is also an object of the invention to provide a stabilized tap construction such that rocking of the taps are reduced, even when taps are subjected to external static and dynamic loads, such as weight of a transmitter and associated "plumbing", e.g. manifolds, which are in fluid communication with the taps of the invention.

It is a still further object of the invention to provide new tap construction and function which will diminish the tendency of a tap to fail by either leakage past the NPT threads, or shearing of the tap itself due to external forces placed upon the tap.

These and other objects of the invention will become apparent by reference to the following description of the preferred embodiments and the appended drawings.

BRIEF DESCRIPTION OF THE DRAWINGS

FIG. 1 is a schematic representation of a front view of the thread supporting stabilizer assembly according to one embodiment of the invention;

FIG. 2 is a side view of the thread supporting stabilizer assembly of FIG. 1;

FIG. 3 is a top view of the thread supporting stabilizer assembly of FIG. 1;

FIG. 4 is a bottom view of the thread supporting stabilizer of FIG. 1;

FIG. 5 is a cross-sectional view of the thread supporting stabilizer along lines 5-5 of FIG. 2;

FIG. 6 is an alternative embodiment of the top view of the thread supporting stabilizer assembly shown in FIG. 3, with FIGS. 1-2, 4 and 5 being the same in this alternative embodiment; and FIG. 7 is a partial cross-sectional view along lines 7-7 of FIG. 6.

DETAILED DESCRIPTION OF THE PREFERRED EMBODIMENTS

Figure 8:
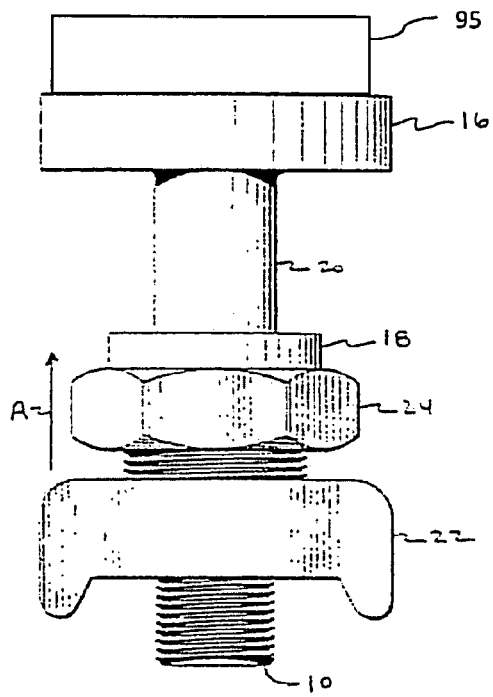
FIG. 8 is a schematic representation of a front view of the threaded supporting stabilizer assembly with a manifold.
Figure 9:
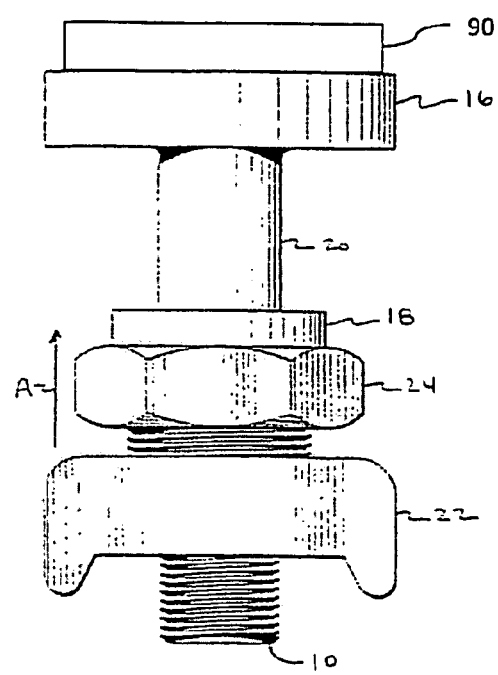
FIG. 9 is a schematic representation of a front view of the threaded supporting stabilizer assembly with a transmitter.
Figure 10:
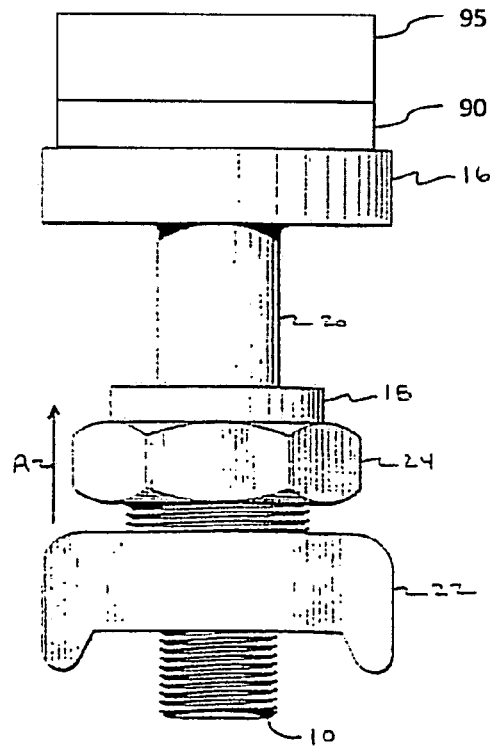
FIG. 10 is a schematic representation of a front view of the threaded supporting stabilizer assembly with a manifold and a transmitter.

As shown in FIG. 1 is a schematic representation of the pressure tap assembly according to the present invention in which, at a proximal end of tap 14, the NPT threads 10 are threadedly engaged with a threaded bore 11 in a conduit, such as pipeline flange 12. At the distal end of the tap 14 is a so-called "futbol" flange 16 named because it has the shape of an American football. These futbol flanges 16 are standardized in the industry to mate with the other "plumbing" fittings to place the fluid in the interior of the pipeline flange 12 in fluid communication with the gauges or pressure transmitters 90 (see FIG. 9) which are ultimately connected therewith. Sometimes the futbol flanges 16 are connected to a manifold 95 (see FIG. 8) provided with one or more valves to direct the high and low pressure fluids to the appropriate inputs of a differential pressure transmitter. In the manifolds 95 some valves may act as equalizer valves or drain valves. Other times the futbol flanges 16 may be attached directly to a flange of a pressure gauge or transmitter (not shown). In yet other embodiments, a manifold 95 may be connected to a transmitter 90 (See FIG. 10).

The taps of the invention are also provided with a stabilizing flange 18 which is mounted intermediate the futbol flange 16 and the NPT threads 10. As shown in FIG. 5 stabilizing flange 18 is integral with body 20 of tap 14. In some instances, the stabilizing flange is made in one piece with body of tap 14. In other embodiments it may be made of a separate piece which is made integral to body 20 by techniques such as welding, pins, or other fastening techniques. Thus it can be readily seen that when a force is exerted upon stabilizing flange 18, which force is directed in the direction of the arrow A, the NPT threads 10 are brought into tight engagement with the threads in the threaded bore of pipeline flange 12.

In order to create the force acting upon the stabilizing flange 18, use is made of the interaction between a stabilizer base 22 and stabilizing nut 24. The stabilizer base defines an internal threaded bore 26 which is threadedly engaged by the external threads 28 of stabilizing nut 24 as best illustrated in FIG. 5. As one relatively manipulates the stabilizer base 22 and stabilizing nut 24 to force them away from each other, a force will be created between pipeline flange 12 and stabilizing flange 18. In addition, by making the stabilizer base relatively larger than the NPT threads 10, the tendency of the tap 14 to "rock" in its threaded engagement with threaded bore 11 will be reduced. Although illustrated for use with pipeline flanges of 6, 8 and 12 inches, the invention is not so limited and can be used with pipeline flanges of any size. Moreover, the drawings are merely schematic and not intended to limit the size of the stabilizer base 22, the stabilizing nut 24, the stabilizing flange 18 or the dimensions of the futbol flange 16.

The invention is also not limited to the specific embodiments illustrated and described as those of ordinary skill in the art upon reading this disclosure will readily envision modifications to the preferred embodiments without departing from the spirit and scope of the disclosed invention. For example, the shape of the stabilizer base may be modified, or provided with individually adjustable feet. The futbol flanges may be changed in shape so as to mate with existing or specially designed manifolds, transmitters, gauges or other "plumbing" components. The manner of shaping the futbol flange to receive bolts or studs can be as having individual apertures 30, 31 (FIGS. 6-7) or elongated slots 32, 33 (FIG. 3). The stabilizing flange may be integral as shown and described or itself may compromise an adjustment feature, i.e. it may have internal threads cooperating with a threaded portion of the body of the tap such that its relative position on the body may be changed. The stabilizing nut may not be hex shaped but may be made with only two flats, square, octagon or other polygonal shape or even partially arcuate. It is to be understood that the invention is not limited to the described embodiments which are given by way of illustration only as it will be readily understood by these skilled in the art that various embodiments and modifications of the invention may be made without departing in spirit or scope from the appended claims.

I claim:

1. A method of stabilizing a pressure tap assembly wherein a pressure tap is threadedly engaged with a source of pressurized fluid, the pressure tap assembly comprising:
    (a) a pressure tap body having distal and proximal ends and a stabilizing flange intermediate said distal and proximal ends;
    (b) said distal end comprising a futbol flange;
    (c) said proximal end comprising an NPT thread;
    (d) a stabilizer base adjacent said proximl end for contact with a vessel containing a source of pressurized fluid;
    (e) a stabilizing nut for impinging on said stabilizing flange and said stabilizer base;
    the method comprising forcing the stabilizer base and stabilizing flange in opposite directions.

2. The method of claim 1 where the forcing reduces the load on the NPT threads.

3. The method of claim 1 where the forcing is created by threaded engagement of the stabilizing nut and stabilizer base.

4. A pressure tap assembly comprising:
    (a) a pressure tap body having distal and proximal ends and a stabilizing flange intermediate said distal and proximal ends;
    (b) said distal end comprising a futbol flange;
    (c) said proximal end comprising an NPT thread;
    (d) a stabilizer base adjacent said proximl end for contact with a vessel containing a source of pressurized fluid;
    (e) a stabilizing nut for impinging on said stabilizing flange and said stabilizer base.

5. The pressure tap assembly of claim 4 when said stabilizer flange is integral with the tap body.

6. The pressure tap assembly of claim 5 when said stabilizer flange is made in one piece with the tap body.

7. The pressure tap assembly of claim 4 when said stabilizer base defines a bore which is internally threaded.

8. The pressure tap assembly of claim 7, wherein said internally threaded bore of said stabilizer base is threadedly engageable with said stabilizing nut.

9. The pressure tap assembly of claim 8 when said stabilizing nut has a thread on an exterior section thereof.

10. The pressure tap assembly of claim 4 which at least a portion of said stabilizing nut is polygonal in shape.

11. The pressure tap assembly of claim 4 is threaded engagement with a vessel containing a fluid under pressure.

12. The pressure tap assembly of claim 11 where the vessel is a pipeline.

13. The pressure tap assembly of claim 12 where the pipeline comprises a flange into which the pressure tap is threadedly engaged.

14. The pressure tap assembly of claim 13 where the futbol flange is connected to a manifold.

15. The pressure tap assembly of claim 14 where the manifold is connected to a transmitter.

16. The pressure tap assembly of claim 13 where the futbol flange is connected to a transmitter.

* * * * *